(12) United States Patent
Raman

(10) Patent No.: US 12,592,924 B2
(45) Date of Patent: Mar. 31, 2026

(54) SMART HUB QUANTUM KEY DISTRIBUTION AND SECURITY MANAGEMENT IN ADVANCED NETWORKS

(71) Applicant: AT&T INTELLECTUAL PROPERTY I, L.P., Atlanta, GA (US)

(72) Inventor: Kaveri Raman, Matawan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 322 days.

(21) Appl. No.: 17/718,207

(22) Filed: Apr. 11, 2022

(65) Prior Publication Data

US 2023/0328064 A1 Oct. 12, 2023

(51) Int. Cl.
*H04L 9/40* (2022.01)
*H04L 9/08* (2006.01)
*H04L 43/08* (2022.01)

(52) U.S. Cl.
CPC ........ *H04L 63/0884* (2013.01); *H04L 9/0858* (2013.01); *H04L 43/08* (2013.01); *H04L 63/20* (2013.01)

(58) Field of Classification Search
CPC ... H04L 63/0884; H04L 9/0858; H04L 43/08; H04L 63/20; H04L 9/0855; H04L 2209/56; H04L 2209/84
See application file for complete search history.

(56) References Cited

U.S. PATENT DOCUMENTS

| | | | | |
|---|---|---|---|---|
| 10,708,046 | B1 * | 7/2020 | Ashrafi | H04L 9/0852 |
| 10,728,029 | B1 * | 7/2020 | Vakili | H04L 9/0869 |
| 2002/0041687 | A1 * | 4/2002 | Parks | H04L 7/0075 |
| | | | | 380/263 |
| 2008/0250443 | A1 * | 10/2008 | Fan | H04L 41/5054 |
| | | | | 379/37 |
| 2016/0277183 | A1 * | 9/2016 | Murakami | H04L 9/0858 |
| 2017/0279540 | A1 * | 9/2017 | Tanizawa | H04B 10/70 |
| 2017/0301220 | A1 * | 10/2017 | Jarrell | H04L 67/125 |
| 2018/0309571 | A1 * | 10/2018 | Arora | H04L 63/0435 |
| 2018/0367301 | A1 * | 12/2018 | Su | H04J 14/06 |
| 2022/0006627 | A1 * | 1/2022 | Ko | H04L 9/0852 |
| 2022/0036352 | A1 * | 2/2022 | De Vos | G06Q 20/3223 |
| 2023/0254133 | A1 * | 8/2023 | He | H04L 63/0428 |
| | | | | 713/153 |
| 2023/0360040 | A1 * | 11/2023 | Childe | G06Q 20/108 |

* cited by examiner

*Primary Examiner* — Nicholas R Taylor
*Assistant Examiner* — Tania M Pena-Santana

(57) ABSTRACT

Smart hub quantum key distribution (QKD) and security management in advanced networks (e.g., 5G and beyond) is presented herein. A smart hub for QKD system provisions, via a network slice of a control plane of a communication network, a group of communication entities within the communication network to facilitate, via a QKD service, a quantum key-based communication session between a pair of communication entities of the group of communication entities; and in response to receiving, from a communication entity of the pair of communication entities via the network slice, a first request to establish the quantum key-based communication session, sending, to a QKD system via a user plane of the communication network, a second request to establish, via the QKD service, the quantum key-based communication session using a quantum-based communication channel.

20 Claims, 12 Drawing Sheets

100

QKD-AS-A-SERVICE SYSTEMS 130

SMART HUB FOR QUANTUM KEY DISTRIBUTION (QKD) SYSTEM 110

SERVICE PROVIDER CORE NETWORK 120

RADIO ACCESS NETWORK 101

102

108

...

104

106

114

116

Figure 2:
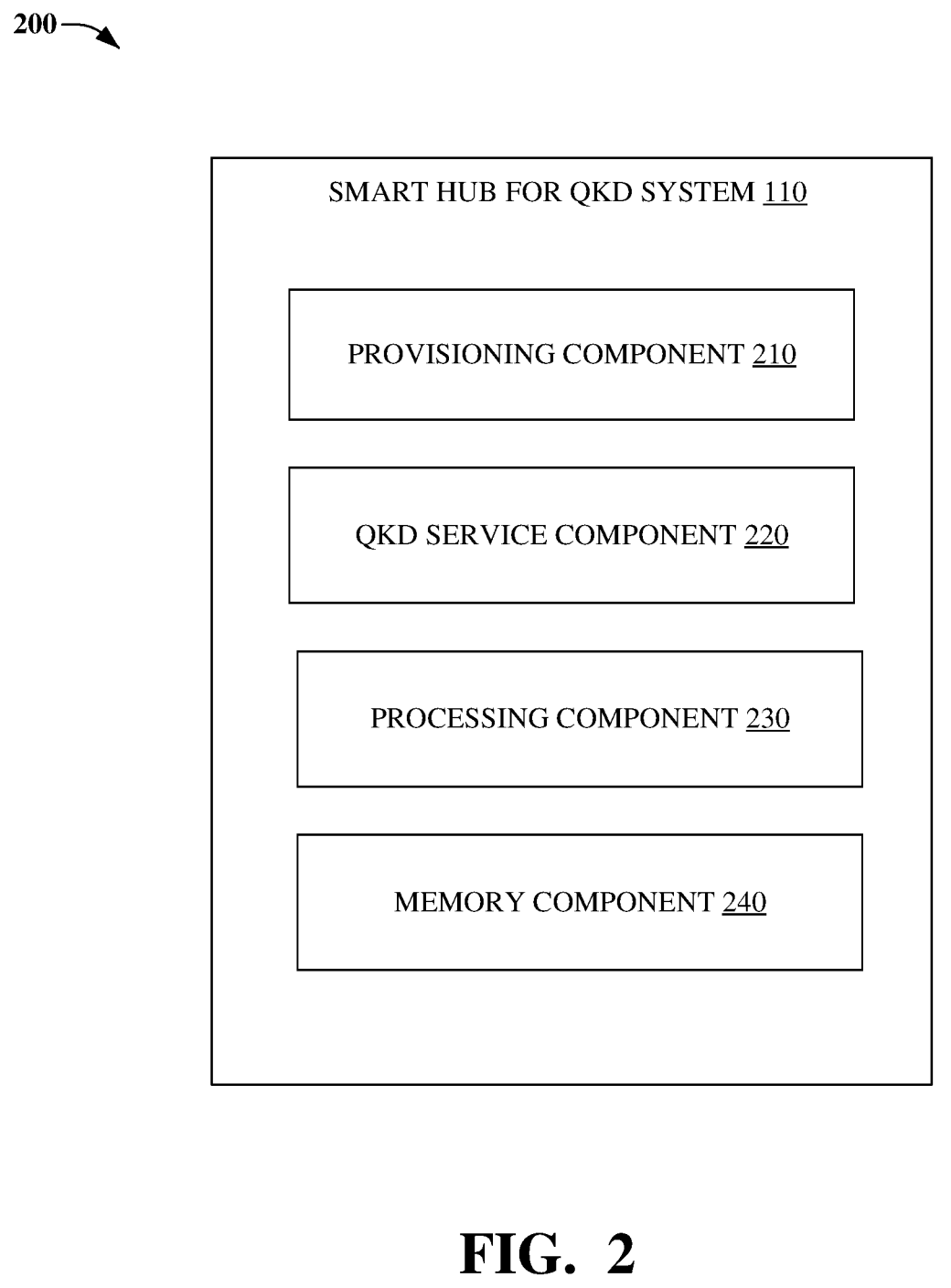

200 ⟶

SMART HUB FOR QKD SYSTEM 110

PROVISIONING COMPONENT 210

QKD SERVICE COMPONENT 220

PROCESSING COMPONENT 230

MEMORY COMPONENT 240

PROVISIONING COMPONENT 210

AUTHENTICATION COMPONENT 310

GROUP REGISTRATION DATA STORE 320

FIG. 3

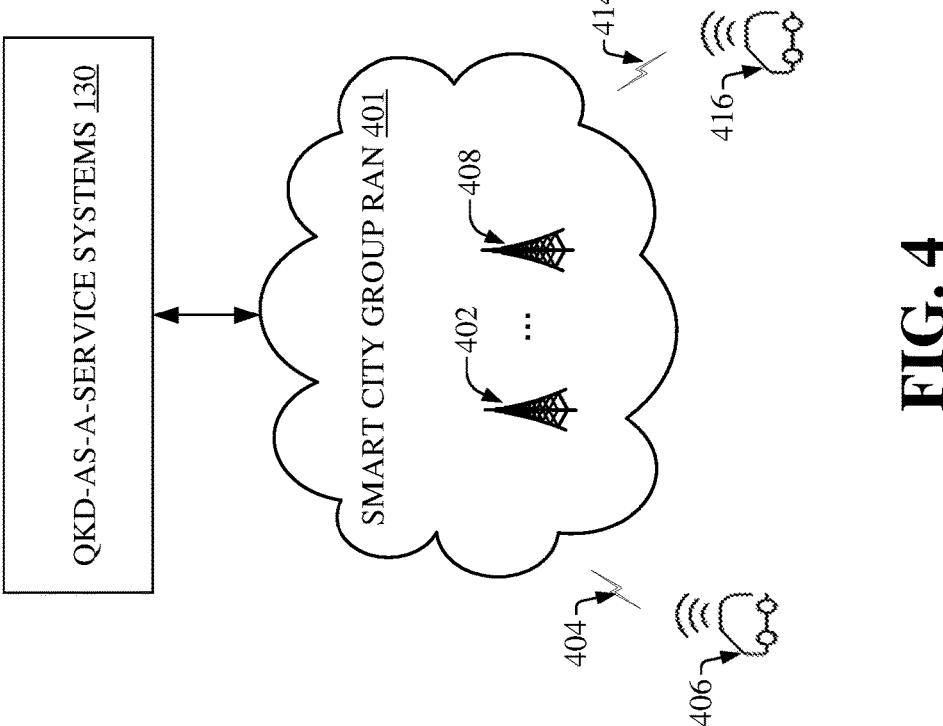
FIG. 4

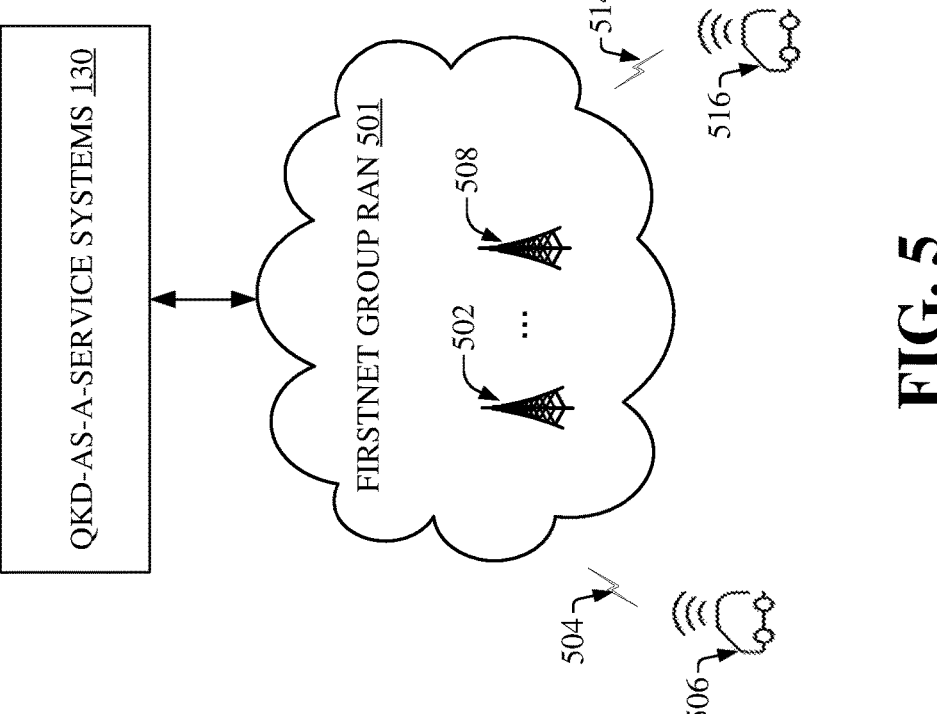
FIG. 5

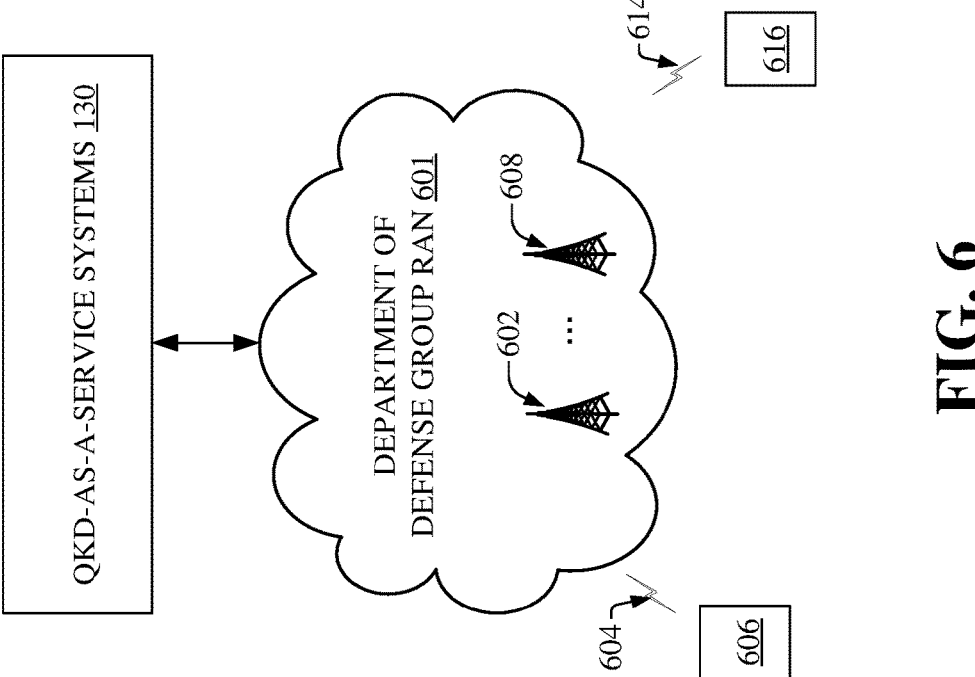
FIG. 6

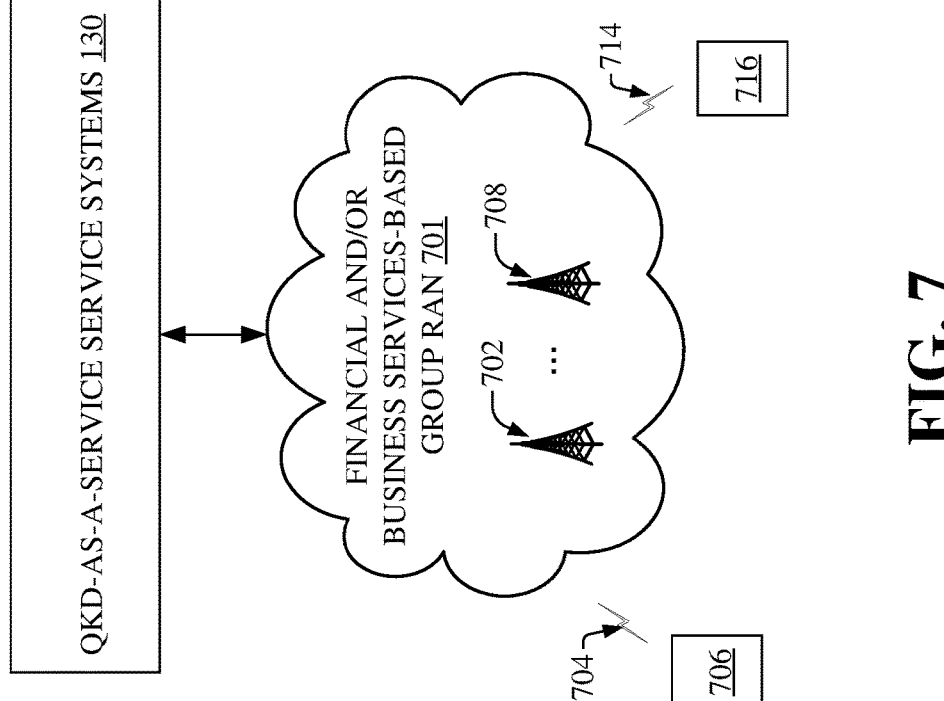
FIG. 7

800

QKD SERVICE COMPONENT 220

GROUP INTERFACE COMPONENT 810

QKD SECURITY AND PERFORMANCE METRICS
COMPONENT 820

QKD SERVICE CHARACTERISTICS DATA STORE 830

900 —

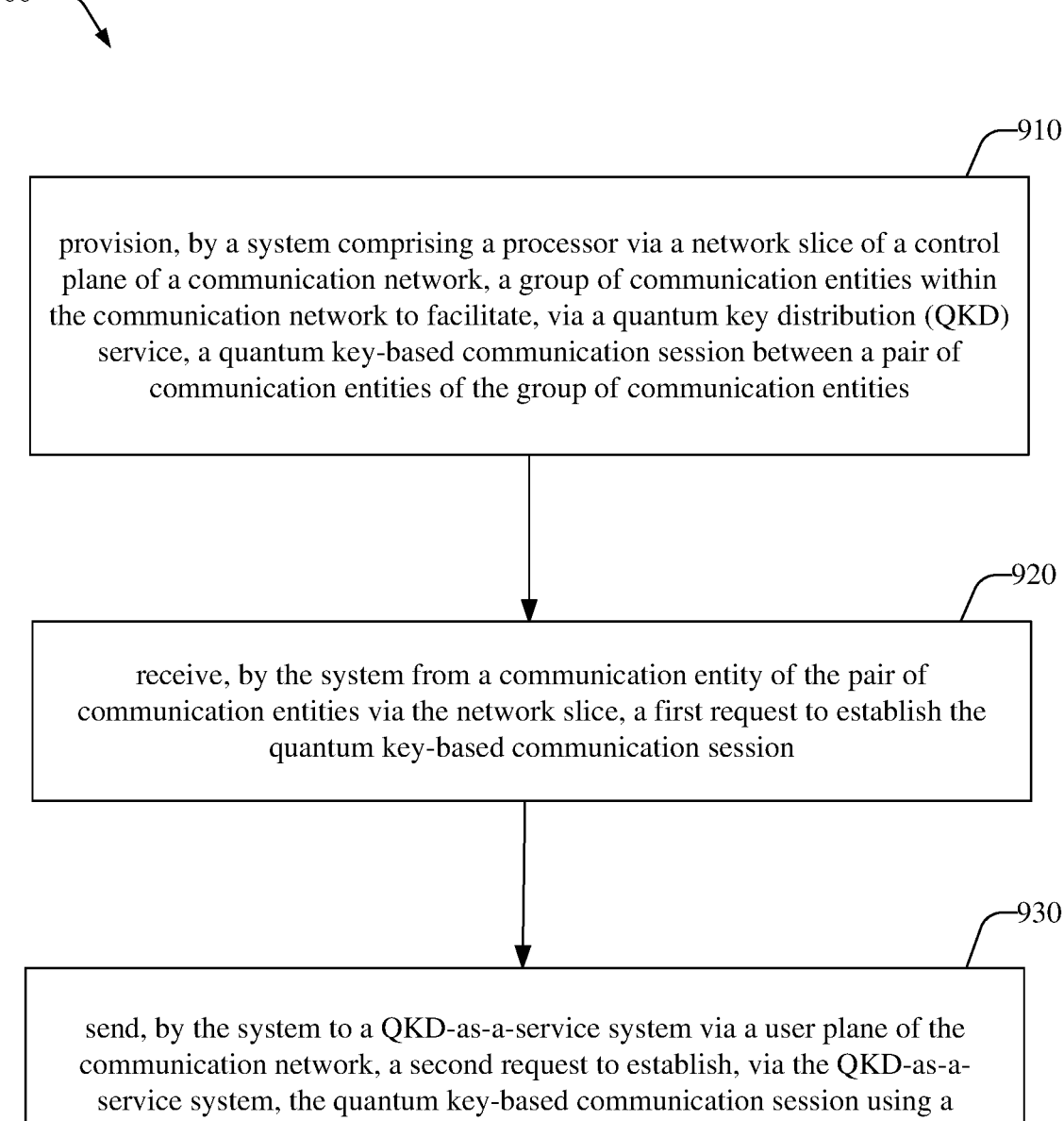

910 provision, by a system comprising a processor via a network slice of a control plane of a communication network, a group of communication entities within the communication network to facilitate, via a quantum key distribution (QKD) service, a quantum key-based communication session between a pair of communication entities of the group of communication entities

920 receive, by the system from a communication entity of the pair of communication entities via the network slice, a first request to establish the quantum key-based communication session

930 send, by the system to a QKD-as-a-service system via a user plane of the communication network, a second request to establish, via the QKD-as-a-service system, the quantum key-based communication session using a quantum-based communication channel

1010 monitor, by the system, characteristics of the quantum key-based communication session

1020 store, by the system, the characteristics in a data store to facilitate analyses of the characteristics,

1030 determine, by the system, performance and security metrics of the quantum key-based communication session

1100

SMART HUB FOR QKD SYSTEM 110

QKD-AS-A-SERVICE SYSTEMS 130

RADIO ACCESS NETWORK 101

108

102

...

114

116

104

106

MACRO NETWORK PLATFORM

1110

PS GATEWAY NODE(S) 1118

SERVING NODE(S) 1116

CS GATEWAY NODE(S) 1112

SERVER(S) 1114

1140

TELEPHONY NW(S)

WAN 1150

SS7 NETWORK 1160

ENTERPRISE NW(S) 1170

SERVICE NW(S) 1180

MEMORY

1130

1200

1228
OPERATING SYSTEM

1230
APPLICATIONS

1232
MODULES

1234
DATA

1212

1214
PROCESSING UNIT

1242
OUTPUT ADAPTER(S)

1240
OUTPUT DEVICE(S)

1216
SYSTEM MEMORY

1220
VOLATILE

1222
NON VOLATILE

1238
INTERFACE PORT(S)

1236
INPUT DEVICE(S)

1218
BUS

1226
INTERFACE

1250
COMMUNICATION CONNECTION(S)

NETWORK INTERFACE

1248

1224
DISK STORAGE

1244
REMOTE COMPUTER(S)

1246
MEMORY STORAGE

SMART HUB QUANTUM KEY DISTRIBUTION AND SECURITY MANAGEMENT IN ADVANCED NETWORKS

TECHNICAL FIELD

The subject disclosure generally relates to embodiments for smart hub quantum key distribution (QKD) and security management in advanced networks (e.g., 5G and beyond).

BACKGROUND

Conventional wireless network technologies intend to support a diverse array of applications having very different communication requirements. In this regard, there will be a considerable need to secure communications related to, e.g., Internet of things (IoT), smart cities, defense and/or critical infrastructure organizations, and vehicle-to-everything (V2X) technologies. Unfortunately, data encryption technologies are susceptible to being breached by "code break-ing" schemes that have enough computing resources to beak and/or decipher encryption coding algorithm(s).

Although conventional quantum key-based communica-tion technologies, e.g., BB84, are directed to providing secure quantum-based communications, such technologies are still under development and are not directed towards securing wireless service-based communications. Conse-quently, conventional communication technologies have had some drawbacks, some of which may be noted with refer-ence to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 2 illustrates a block diagram of a smart hub for QKD system that facilitates, via a QKD-based wireless commu-nication service, secure quantum key-based communication (s) between communication entities of a group of commu-nication entities that have been provisioned to utilize the QKD-based wireless communication service, in accordance with various example embodiments;

FIG. 3 illustrates a block diagram of a provisioning component of a smart hub for QKD system that facilitates, via a QKD-based wireless communication service, secure quantum key-based communication(s) between communi-cation entities of a group communication entities that have been provisioned to utilize the QKD-based wireless com-munication service, in accordance with various example embodiments;

FIG. 4 illustrates a block diagram of a portion of a smart hub for QKD system environment comprising a smart city group that has been provisioned to utilize a QKD-based wireless communication service to facilitate, via the QKD-based wireless communication service, secure quantum key-based communication(s) between communication entities of the smart city group, in accordance with various example embodiments;

FIG. 5 illustrates a block diagram of a portion of a smart hub for QKD system environment comprising a firstnet group that has been provisioned to utilize a QKD-based wireless communication service to facilitate, via the QKD-based wireless communication service, secure quantum key-based communication(s) between communication entities of the firstnet group, in accordance with various example embodiments;

FIG. 6 illustrates a block diagram of a portion of a smart hub for QKD system environment comprising a department of defense group that has been provisioned to utilize a QKD-based wireless communication service to facilitate, via the QKD-based wireless communication service, secure quantum key-based communication(s) between communi-cation entities of the department of defense group, in accor-dance with various example embodiments;

FIG. 7 illustrates a block diagram of a portion of a smart hub for QKD system environment comprising a financial and/or business services-based group that has been provi-sioned to utilize a QKD-based wireless communication service to facilitate, via the QKD-based wireless communi-cation service, secure quantum key-based communication(s) between communication entities of the financial and/or business services-based group, in accordance with various example embodiments;

FIG. 9 illustrates a flowchart of a method for facilitating, via a QKD-based wireless communication service, secure quantum key-based communication(s) between communi-cation entities of a group of communication entities that have been provisioned to utilize the QKD-based wireless communication service, in accordance with various example embodiments;

DETAILED DESCRIPTION

Figure 1:
FIG. 1 illustrates a block diagram of a smart hub for QKD system environment that facilitates, via a QKD-based wire-less communication service, secure quantum key-based communication(s) between communication entities of a group of communication entities that have been provisioned to utilize the QKD-based wireless communication service, in accordance with various example embodiments.

Aspects of the subject disclosure will now be described more fully hereinafter with reference to the accompanying drawings in which example embodiments are shown. In the following description, for purposes of explanation, numer-ous specific details are set forth in order to provide a thorough understanding of the various embodiments. However, the subject disclosure may be embodied in many different forms and should not be construed as limited to the example embodiments set forth herein.

As described above, conventional data encryption technologies have had some drawbacks with respect to being susceptible to code breaking of encrypted communications. Further, conventional quantum key-based communication technologies are nascent and thus have not been able to provide, via communication network(s), secure quantum-based communications. On the other hand, various embodiments described herein can enable, via a smart hub for QKD system, secure quantum-key based communication(s) between subscribers of a QKD-based wireless communication service.

For example, in embodiment(s), a smart hub for QKD system comprises a provisioning component and a QKD service component. The provisioning component provisions, via a network slice of a control plane of a communication network, a group of communication entities within the communication network (e.g., entities within a smart city group, a firstnet group, a government-based (e.g., department of defense) group, a financial group, or a business-based group) to facilitate, via a QKD service, e.g., a QKD-based wireless communication service, a quantum key-based communication session between a pair of communication entities of the group.

In this regard, in various embodiment(s), the provisioning component provisions the communication entities within the group by authenticating and/or validating that each entity is authorized to be a member of the group, e.g., that each member is allowed access to the QKD-based wireless communication service for communicating between members of the group. Further, in response to authenticating and/or validating each entity, the provisioning component registers, e.g., stores in a data store, information related the entity that has been authorized to be the member of the group, e.g., that has been authorized to access the QKD-based wireless communication service between members of the group.

Further, in response to receiving, from a communication entity of the pair of communication entities via the network slice, a first request to establish the quantum key-based communication session, the QKD service component sends, to a QKD-as-a-service-based system, e.g., of a group of QKD-as-a-service-based systems, via a user plane of the communication network, a second request to establish, via the QKD-as-a-service-based system, the quantum key-based communication session using a quantum-based communication channel, e.g., fiber optic, satellite-based, or other optical-based communication channel, e.g., that is communicatively coupled to a core network of a wireless service provider corresponding to the QKD-as-a-service-based system.

In embodiment(s), the QKD service component sends, via the second request, information identifying another communication entity of the pair of communication entities that the communication entity requests to establish the quantum key-based communication session with.

In other embodiment(s), the QKD-based wireless communication service, via the QKD-as-a-service-based system, distributes a quantum key between the pair of communication entities, in which the quantum key has been generated by a quantum key encryption algorithm (e.g., quantum key encryption process), and in which the quantum key is to be used, via the pair of communication entities, to encrypt the quantum key-based communication session to facilitate a secure communication between the communication entities.

In yet other embodiment(s), the QKD service component comprises a group interface component and a QKD security and performance metrics component. The provisioning component sends/receives, via the group interface component, information to/from communications entities with respect to authenticating, validating, and/or registering the communication entities with a corresponding group of communication entities to enable the communication entities to access the QKD-based wireless communication service between members of the group of communication entities. The provisioning component further receives, via the group interface component, respective requests to establish, via the QKD-based wireless communication service, respective quantum key-based communication sessions between respective pairs of communication entities of the group of communication entities.

In embodiment(s), the QKD security and performance metrics component monitors characteristics of the quantum key-based communication session. In an embodiment, the QKD security and performance metrics component receives the characteristics from the QKD-as-a-service-based system, e.g., the characteristics being determined and/or measured by the QKD-as-a-service-based system; stores the characteristics in a QKD service characteristics data store (e.g., a data lake that is established in the cloud); and determines security metrics, e.g., whether a communication breach may have occurred during the quantum-key based communication session, and performance metrics, e.g., photon characteristics and/or attenuation of electromagnetic radiation corresponding to the quantum-based communication channel.

In other embodiment(s), the QKD security and performance metrics component sends, via the group interface component, e.g., on an as-generated and/or subscription (e.g., fee-based) basis, the performance metrics and/or the security metrics to respective communication entities, e.g., that have paid to subscribe to receive, via the QKD-based wireless communication service, such metrics from the QKD-as-a-service-based system.

In yet other embodiment(s), a method comprises provisioning, by a system comprising a processor via a network slice of a control plane of a wireless network, a group of communication devices within the wireless network for a QKD-based communication between respective pairs of communication devices of the group of communication devices; receiving, by the system from a communication device of a pair of communication devices of the respective pairs of communication devices via the network slice, a communication request to establish the QKD-based communication; and based on the communication request, sending, by the system via a user plane of the wireless network, an establishment request to a QKD system to facilitate establishment, using a quantum-based communication channel via a QKD service, of the quantum key distribution-based communication.

In embodiment(s), the provisioning the group of communication devices comprises: in response to authenticating, using the network slice, the communication devices for access to the QKD service, registering, using the network slice, the communication devices with the group of communication devices.

In other embodiment(s), the method further comprises: in response to characteristics of the QKD-based communication being monitored, storing, by the system, the characteristics in a data store, e.g., data lake established in the cloud, to facilitate analyses, e.g., via artificial intelligence (AI)-based big data analyses (e.g., utilizing Hadoop), of the characteristics corresponding to a performance of the QKD-based communication and a security of the quantum key distribution-based communication.

In yet other embodiment(s), a machine-readable storage medium comprises executable instructions that, when executed by a processor, facilitate performance of operations, comprising: in response to communication entities of a group of communication entities being authenticated to enable access to a QKD-based wireless service, provisioning, via a control plane of a wireless network, the group of communication entities within the wireless network to facilitate a QKD-based communication between respective communication entities of the group of communication entities; and in response to receiving, from a communication entity of the respective communication entities, a communication request to securely communicate with another communication entity of the respective communication entities using a quantum key-based communication session corresponding to a QKD system, sending, via a user plane of the network, a request to the QKD system to facilitate establishment, via the QKD-based wireless communication service, of the QKD-based communication using a quantum-based communication channel.

Reference throughout this specification to "one embodiment," "an embodiment," and so on means that a particular feature, structure, or characteristic described in connection with the embodiment is included in at least one embodiment. Thus, the appearances of the phrase "in one embodiment," "in an embodiment," and so on in various places throughout this specification are not necessarily all referring to the same embodiment. Furthermore, the particular features, structures, or characteristics may be combined in any suitable manner in one or more embodiments.

As mentioned above, conventional communication technologies have had some drawbacks with respect to being susceptible to code breaking, and not securing, via a communication network, quantum-based communications between wireless communication entities. To address these and other concerns of conventional communication technologies, various embodiments disclosed herein can enable secure communications between subscribers of a QKD-based wireless communication service by facilitating secure quantum key-based communication(s) between the subscribers.

In this regard, FIG. 1 illustrates a block diagram of a smart hub for QKD system environment (100) that facilitates, via a QKD-based wireless communication service, secure quantum key-based communication(s) between communication entities of a group of communication entities that have been provisioned to utilize the QKD-based wireless communication service, in accordance with various example embodiments.

The smart hub for QKD system environment comprises a communication network of a wireless service provider—the communication network including a core network (service provider core network (120)) coupled to a radio access network (RAN) (101), a smart hub for QKD system (110), and a group of QKD systems (e.g., QKD service systems, QKD-as-a-service systems (130)).

The service provider core network (120) comprises various components, e.g., a network exposure function (NEF), a network data analytics function (NWDAF), an application function (AF), a policy control function (PCF), an access and mobility management function (AMF), a session management function (SMF), and a network slice selection function (NSSF) (all not shown) that can affect the provisioning and use of network slices, e.g., virtual network functions, in embodiments described herein. In this regard, the service provider core network can provision—based on respective policies, authentications, and registrations—each wireless device of a group of wireless devices (106, 116) with information representing slice(s), type(s) of slice(s), and/or network slice(s) that the wireless device should attach to, e.g., via a control plane of the service provider core network, to facilitate use, by the wireless device via the RAN, of the QKD-based wireless communication service—the wireless device representing a communication entity, and the group of wireless devices representing the group of communication entities.

In embodiment(s), the communication entities comprise, e.g., a UE, an IoT device, an appliance, a security device, a utility meter, a cellular phone, a smartphone, and/or a vehicle control device of a vehicle (e.g., an autonomous vehicle) corresponding to a vehicle-to-everything (V2X) network); and the group of communication entities comprise, e.g., a smart city group corresponding to a smart city, a first responder network authority (firstnet) group corresponding to public safety and/or emergency services, a department of defense group corresponding to national security (e.g., Homeland security) and military entities (e.g., United States (US) armed forces (Air Force, Army, Navy, Marines, Space Force, Coast Guard), and/or a financial and/or business services-based group corresponding to financial service entities (e.g., banks, credit-card companies, insurance companies, stock brokerages, investment funds) and/or business service entities (e.g., application service providers (ASPs) that provide compute-based services to customers over a network, information technology (IT) service entities that provide IT services to customers over a network).

The RAN comprises various coverage cells, or wireless coverage areas, to communicatively couple, via respective wireless radio links (104, 114), the wireless devices, or communication entities, to the service provider core network to facilitate the use of the QKD-based wireless communication service. In this regard, the service provider core network can comprise cellular wireless technologies, e.g., 4G, 5G, and beyond; 3GPP UMTS; high speed packet access (HSPA); 3GPP LTE; third generation partnership project 2 (3GPP2); ultra-mobile broadband (UMB); and/or LTE-A corresponding to the RAN. In turn, the RAN comprises base station(s), base transceiver station(s), and/or access point(s) (e.g., 102, 108) and associated electronic circuitry and deployment site(s), in addition to the respective wireless radio links, operated in accordance with the base station(s), base transceiver station(s), and/or access point(s).

The respective wireless radio links can comprise an over-the-air wireless link comprising a downlink (DL) and an uplink (UL) (both not shown) that can utilize a predetermined band of radio frequency (RF) spectrum associated with, e.g., 4G, 5G, and beyond; cellular; LTE; LTE advanced (LTE-A); GSM; 3GPP universal mobile telecommunication system (UMTS); Institute of Electrical and Electronics Engineers (IEEE) 802.XX technology (e.g. WiFi, Bluetooth); worldwide interoperability for microwave access (WiMax); a wireless local area network (WLAN); Femto; near field communication (NFC); Wibree; Zigbee; satellite; and/or WiFi Direct. Accordingly, the RAN can be associated with RF spectrums corresponding to respective types of wireless technologies including, but not limited to, cellular, WiFi, WiMax, WLAN, Femto, NFC, Wibree, Zigbee, satellite, and/or WiFi Direct.

QKD systems, e.g., QKD-as-a-service based systems (130), comprise respective quantum-based communication channels, e.g., fiber optic, satellite-based, or other optical-based communication channels that are communicatively coupled between the RAN and the service provider core network to facilitate the use of the QKD-based wireless communication service, e.g., to provide, via a quantum-based communication channel of the respective quantum-based communication channels, a quantum key-based communication session between a pair of communication entities (106, 116) of the group of communication entities that have been provisioned to utilize the QKD-based wireless communication service.

In this regard, the smart hub for QKD system comprises a provisioning component (210), a QKD service component (220), a processing component (230), and a memory component (240). The provisioning component provisions, via a network slice of a control plane of the communication network, a group of communication entities (e.g., 106, 116) within the communication network to facilitate, via the QKD-based wireless communication service, the quantum key-based communication session between the pair of communication entities of the group of communication entities.

Figure 3:
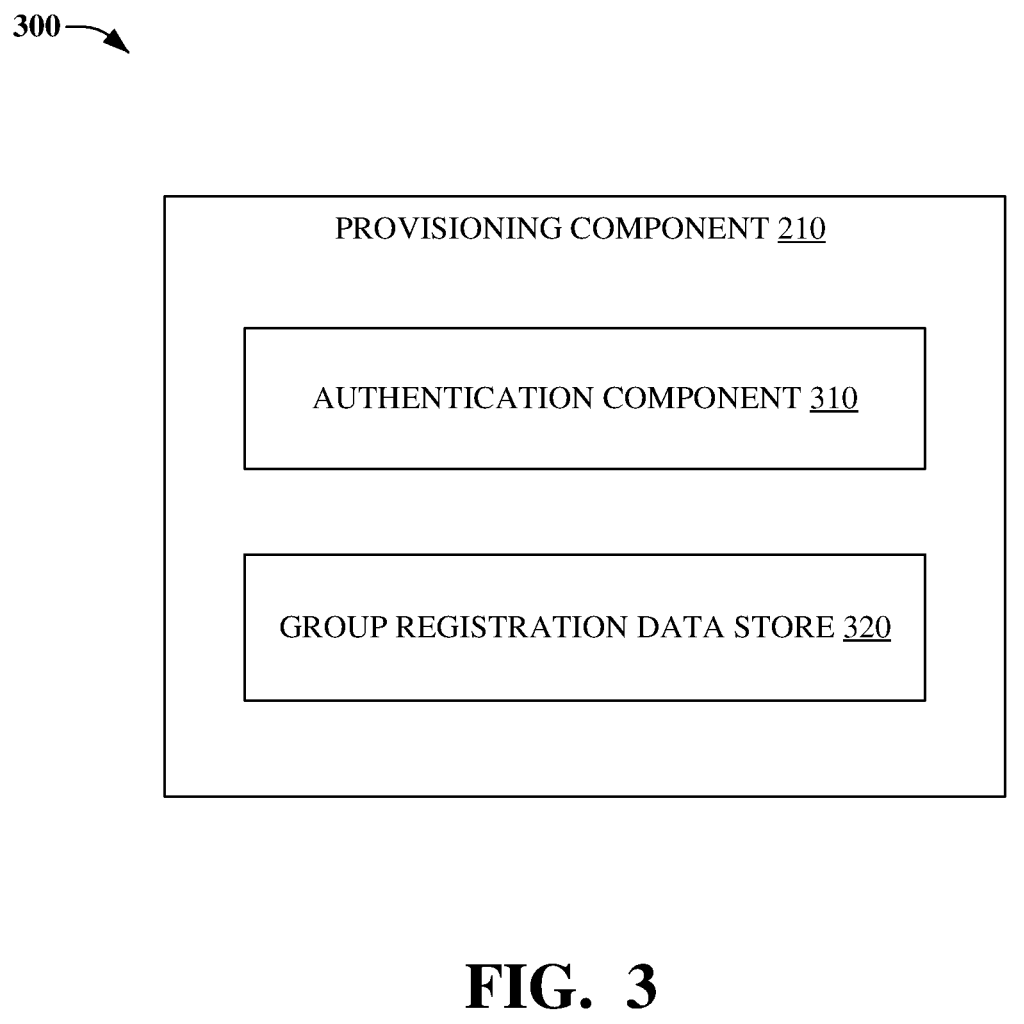

Referring now to FIG. 3, in embodiment(s), the provisioning component provisions the group of communication entities (e.g., 106, 116) within the communication network using an authentication component (310) and a group registration data store (320). For example, based on authorization information that has been stored in the memory component of the smart hub for QKD system, the provisioning component authenticates/validates, using the network slice, that a communication entity (e.g., communication device, wireless communication device) has been authorized to be a member of the group, e.g., that the communication entity has been authorized to access the QKD-based wireless communication service between members of the group. In turn, the authentication component associates the communication entity with the group of communication entities by registering, or storing, information representing such association in the group registration data store.

In embodiment(s), in response to a first request to establish the quantum key-based communication session being received from a communication entity of the pair of communication entities via the network slice, the authentication component determines/verifies, via the group registration data store, whether the communication entity is a member of the group of communication entities that has been authorized to access the QKD-based wireless communication service between members of the group.

In turn, in response to the communication entity being determined to be a member of the group, the QKD service component sends, to a QKD system of the QKD-as-a-service-based systems via a user plane of the communication network, a second request to establish, via the QKD system, the quantum key-based communication session using the quantum-based communication channel, e.g., that is communicatively coupled between the RAN and the service provider core network.

In other embodiment(s), the QKD service component sends, via the second request, information identifying another communication entity (e.g., "second communication entity") of the pair of communication entities that the communication entity (e.g., "first communication entity") requests to establish the quantum key-based communication session with.

Further, based on the second request and the information identifying the second communication entity, QKD-based wireless communication service, via the QKD system, distributes a quantum key between the pair of communication entities, e.g., between the first communication entity and the second communication entity. In this regard, the quantum key has been generated by a quantum key encryption algorithm, e.g., a quantum key encryption process. Further, the quantum key is used, via the pair of communication entities, to encrypt the quantum key-based communication session to facilitate a secure communication between the communication entities.

It should be appreciated that one or more portions of elements, components, and/or devices of the smart hub for QKD system environment (e.g., QKD-as-a-service systems (130), smart hub for QKD system (110)) can be located/included within one or more elements (e.g., hardware, software) of the smart hub for QKD system environment, e.g., the RAN (101), the service provider network (120), and/or the cloud.

In this regard, in embodiment(s), one or more elements, components, and/or devices of the QKD-as-a-service systems, e.g., corresponding to the quantum-based communication channel, can be physically located close to, e.g., based on a defined maximum distance from, various components, elements, and/or devices of the RAN, e.g., with respect to proximity and/or propagation delay, to facilitate optimized performance of the QKD-based wireless communication service and/or to facilitate monitoring of characteristics of the quantum key-based communication session and/or channel.

FIGS. 4-7 illustrate block diagrams (400-700) of a smart hub for QKD system environment comprising respective groups of communication entities including a smart city group (corresponding to a smart city group RAN (401)), a firstnet group (corresponding to a firstnet group RAN (501)), a department of defense group (corresponding to a department of defense group RAN (601)), and a financial and/or business services-based group (corresponding to a financial and/or business services-based group RAN (701)) that have been provisioned to utilize a QKD-based wireless communication service to facilitate, via the QKD-based wireless communication service, secure quantum key-based communication(s) between communication entities of the respective groups of communication entities, in accordance with various example embodiments.

Referring now to FIG. 4, in embodiment(s), the smart city group of communication entities (406, 416) is part of a smart city communication network that is associated with a geographical area representing a city, e.g., Seattle, New Jersey, Boston. In various embodiment(s), the communication entities can comprise autonomous vehicles (e.g., located within geographical area) and utilize, via the QDK-as-a-service systems, the QKD-based wireless communication service to communicate, e.g., via a V2X-based communication protocol, with other communication entities of the smart city group—the other communication entities comprising an autonomous vehicle, a pedestrian, a network device of the communication network, and or a wireless device.

In this regard, the quantum key-based communication session can correspond to collision warnings, lane changing/blind spot warnings, intersection movement assist (e.g., warning of other vehicles running a red light or making sudden turns), emergency vehicle approach warnings (e.g., that an emergency vehicle is approaching), road work warnings (e.g., of road hazards due to road construction), and/or platooning (e.g., decreasing a distance between autonomous vehicles).

In other embodiment(s), the communication entities can comprise wireless devices, e.g., utility measurement devices, IoT devices, or mobile devices, e.g., the wireless devices being located within the geographical area.

As illustrated by FIG. 4, the communication entities communicate with other communication entities of the smart city group via wireless radio links (404, 414) that are coupled to base station(s), base transceiver station(s), and/or access point(s) (e.g. 402, 408) of the smart city group RAN (401).

Referring now to FIG. 5, in embodiment(s), the firstnet group of communication entities (506, 516) is part of a firstnet communication network that is associated with a firstnet public safety communication network. In various embodiment(s), the communication entities (506, 516) can comprise emergency response vehicles and/or entities corresponding to, e.g., law enforcement-based services (e.g., police), ambulance-based services, border patrol-based services, or other services corresponding to emergency response and/or public safety services. In embodiment(s), the communication entities can utilize, via the QDK-as-a-service systems, the QKD-based wireless communication service to communicate with other communication entities of the firstnet group As illustrated by FIG. 5, the communication entities communicate with other communication entities of the first-net group via wireless radio links (504, 514) that are coupled to base station(s), base transceiver station(s), and/or access point(s) (e.g. 502, 508) of the firstnet group RAN (501).

Referring now to FIG. 6, in embodiment(s), the department of defense group of communication entities (606, 616) is part of a department of defense communication network. In various embodiment(s), the communication entities (606, 616) comprise national security entities (e.g., Homeland security) and military entities (e.g., US Air Force, US Army, US Navy, US Marines, US Space Force, US Coast Guard). In embodiment(s), the communication entities can utilize, via the QDK-as-a-service systems, the QKD-based wireless communication service to communicate with other communication entities of the department of defense group.

As illustrated by FIG. 6, the communication entities communicate with other communication entities of the department of defense group via wireless radio links (604, 614) that are coupled to base station(s), base transceiver station(s), and/or access point(s) (e.g. 602, 608) of the department of defense group RAN (601).

Referring now to FIG. 7, in embodiment(s), the financial and/or business services-based group of communication entities (706, 716) is part of a financial and/or business services communication network. In various embodiment(s), the communication entities (706, 716) comprise financial service entities (e.g., banks, credit-card companies, insurance companies, stock brokerages, investment funds) and/or business service entities (e.g., ASPs that provide compute-based services to customers over the communication network, IT service entities that provide IT services to customers over the communication network). In embodiment(s), the communication entities can utilize, via the QDK-as-a-service systems, the QKD-based wireless communication service to communicate with other communication entities of the financial and/or business services-based group, e.g., for completing financial transactions, monetary transactions As illustrated by FIG. 7, the communication entities communicate with other communication entities of the financial and/or business services-based group via wireless radio links (704, 714) that are coupled to base station(s), base transceiver station(s), and/or access point(s) (e.g. 702, 708) of the financial and/or business services-based group RAN (601).

Figure 8:
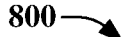
FIG. 8 illustrates a block diagram of a QKD service component of a smart hub for QKD system that facilitates, via a QKD-based wireless communication service, secure quantum key-based communication(s) between communi-cation entities of a group of communication entities that have been provisioned to utilize the QKD-based wireless communication service, in accordance with various example embodiments.

Now referring to FIG. 8, a block diagram (800) of a QKD service component (220) of a smart hub for QKD system (110) is illustrated, in accordance with various example embodiments. The QKD service component comprises a group interface component (810), a QKD security and performance metrics component (820), and a QKD service characteristics data store (830).

The group interface component sends/receives to/from a communication entity information that is used, via the authentication component, to authenticate/validate that the communication entity has been authorized to use the QKD-based wireless communication service between another communication entity, or member, of the group of communication entities.

In other embodiment(s), the group interface component receives, from a first communication entity of a group of communication entities via the network slice, a request to establish, via the QKD-based wireless communication service, a quantum key-based communication session between the first communication entity and a second communication entity of the group of communication entities. Further, as described above, in response to the request to establish the quantum key-based communication session being received from the first communication entity, the authentication component determines/verifies, via the group registration data store, whether the first communication entity is a member of the group of communication entities that has been authorized to access, via the QKD-based wireless communication service, the quantum key-based communication session between members of the group, e.g., between the first communication entity and the second communication entity.

In this regard, in response to the first communication entity being determined to be authorized to access the quantum key-based communication service, the QKD service component sends, to a QKD system of the QKD-as-a-service-based systems via a user plane of the communication network, a request to establish, via the QKD system, the quantum key-based communication session—the request comprising information identifying the second communication entity to facilitate the quantum key-based communication session between the first communication entity and the second communication entity.

In yet other embodiment(s), the group interface component receives, from the communication entity, an input representing a selection of the quantum key encryption algorithm that represents that the quantum key encryption algorithm is to be used, via the QKD system, for the quantum key-based communication session.

In embodiment(s), the group interface component receives, from the communication entity, an input representing a selection of the QKD system that represent that the QKD system is to be used to establish, via the QKD system, the quantum key-based communication session.

The QKD security and performance metrics component monitors, via the QKD system, characteristics of the quantum key-based communication session, e.g., characteristics of the quantum key-based communication channel. In an embodiment, the QKD security and performance metrics component receives the characteristics from the QKD system, e.g., the characteristics being determined and/or measured by the QKD system.

In embodiment(s), the characteristics of the quantum key-based communication session are determined and/or measured from the quantum-based communication channel, e.g., a fiber optic, satellite-based, or other optical-based communication channel. In this regards, in embodiment(s), data of the communication session are stored in respective qubits. Further, the data is communicated on the quantum-based communication channel via respective photons, e.g., propagating photons, as respective flying qubits.

In various embodiment(s), the characteristics of the quantum key-based communication channel are determined and/or measured based on respective properties of the respective photons and/or the respective flying qubits, and comprise a photon measurement, a photon polarization, a photon entanglement, an attenuation of an electromagnetic radiation, and/or information representing that a potential security breach of the quantum key-based communication session has occurred.

In embodiment(s), the security and performance metrics component stores the characteristics of the quantum key-based communication channel in the QKD service characteristics data store, e.g., a data lake that has been established in the cloud, to facilitate analyses of the characteristics.

In other embodiment(s), the analyses of the characteristics comprises determining, based on the characteristics that have been stored in the QKD service characteristics data store, performance metrics of the quantum key-based communication session and security metrics of the quantum key-based communication session. In this regard, in an embodiment, the security and performance metrics component determines, based on the stored characteristic data, the performance metrics and the security metrics, e.g., whether a communication breach may have occurred during the quantum-key based communication session.

In yet other embodiment(s), the security and performance metrics component analyzes the characteristics using the stored characteristic data via AI-based analyses, e.g., via big data analyses (e.g., utilizing Hadoop) of the stored characteristic data.

In embodiment(s), the security and performance metrics component collects quantum communications data comprising the stored characteristics data to facilitate the AI-based analyses. For example, the quantum communication data comprises and/or represents communication/wireless device performance, communication/wireless device management, quality or robustness of the quantum-based communication channel, reliability of the quantum-based communication channel, determined vulnerabilities of the quantum-based communication channel, detection of roque QDK channel(s) that have been established by a communication entity that is not an authenticated/authorized communication entity (or member) of a group of communication entities, and/or detection of unauthorized access of the quantum key-based communication channel.

In other embodiment(s), the security and performance metrics component generates customized reports for respective groups of communication entities—the customized reports representing portion(s) of the quantum communications data that have been specified by the respective groups of communication entities to be collected for the respective groups of communication entities.

In yet other embodiment(s), the security and performance metrics component can evaluate, based on the quantum communications data, the performance of respective quantum key encryption algorithms that have been used for respective quantum key-based communication sessions.

In embodiment(s), the QKD security and performance metrics component sends, via the group interface component, e.g., on an as-generated and/or on a subscription (e.g., fee-based) basis, the performance metrics and/or the security metrics to respective communication entities and/or respective groups of communication entities, e.g., that have paid to subscribe to receive, via the QKD-based wireless communication service, such metrics from the QKD system.

Figure 10:
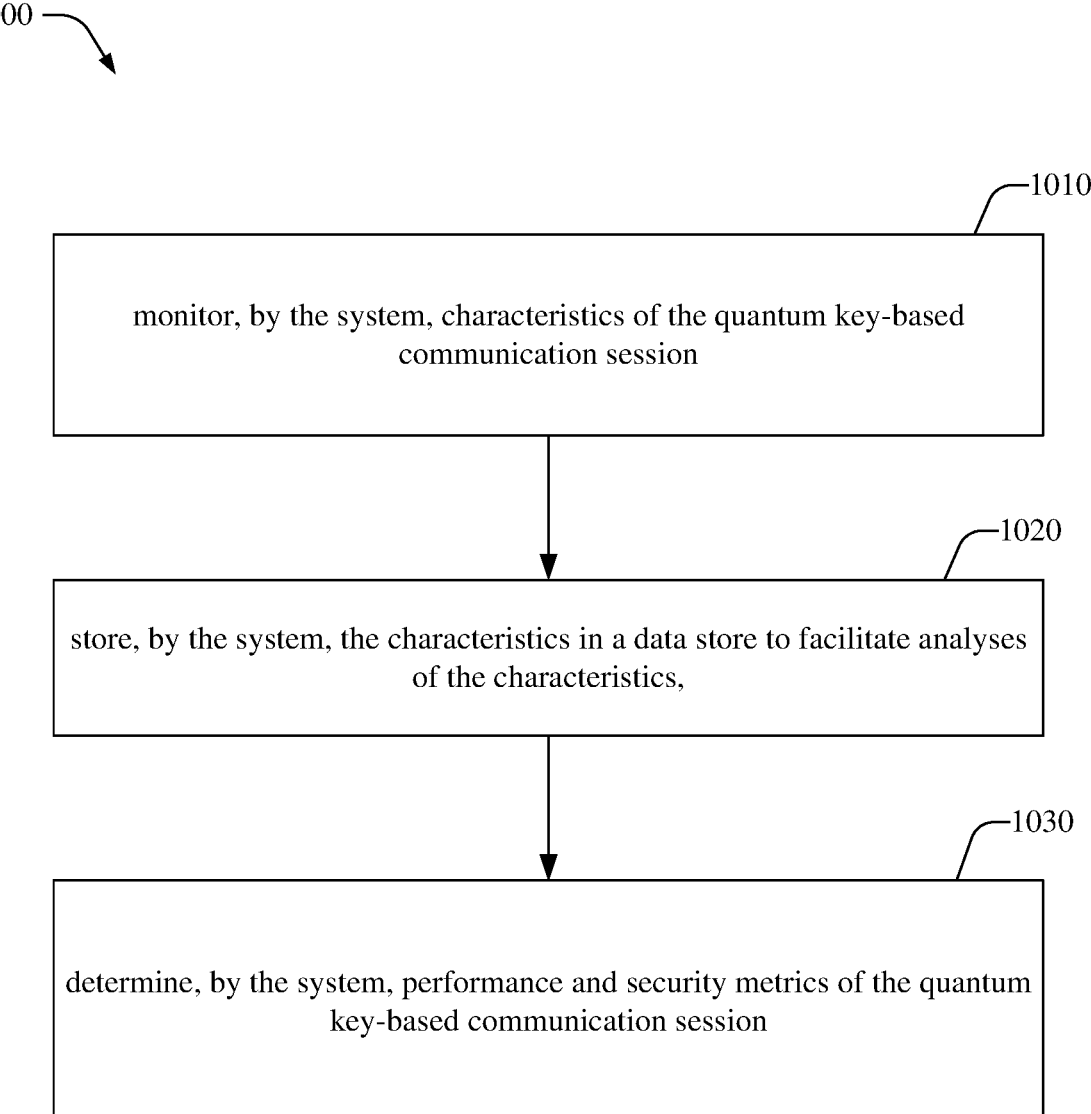
FIG. 10 illustrates a flow chart of a method for facilitating analyses of performance and security metrics of a quantum key-based communication between communication entities of a group of communication entities that have been provi-sioned to utilize a QKD-based wireless communication service, in accordance with various example embodiments.

FIGS. 9 and 10 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 9, a flowchart (900) of a method for facilitating, via a QKD-based wireless communication service, secure quantum key-based communication(s) between communication entities of a group of communication entities that have been provisioned to utilize the QKD-based wireless communication service is illustrated, in accordance with various example embodiments. At 910, a system (110) comprising a processor, provisions, via a network slice of a control plane of a communication network, a group of communication entities within the communication network to facilitate, via a QKD service, a quantum key-based communication session between a pair of communication entities of the group of communication entities.

At 920, the system receives, from a communication entity of the pair of communication entities via the network slice, a first request to establish the quantum key-based communication session. At 930, the system sends, to a QKD-as-a-service system via a user plane of the communication network, a second request to establish, via the QKD-as-a-service system, the quantum key-based communication session using a quantum-based communication channel.

FIG. 10 illustrates a flow chart (1000) of a method for facilitating analyses of performance and security metrics of a quantum key-based communication between communication entities of a group of communication entities that have been provisioned to utilize a QKD-based wireless communication service, in accordance with various example embodiments. At 1010, a system (110) monitors characteristics of the quantum key-based communication session. At 1020, the system stores the characteristics in a data store, e.g., data lake, to facilitate analyses of the characteristics. At 1030, the system determines, e.g., via AI-based analyses, performance and security metrics of the quantum key-based communication session.

Figure 11:
FIG. 11 illustrates a block diagram of a wireless network environment including a smart hub for QKD system that facilitates, via a QKD-based wireless communication ser-vice, secure quantum key-based communication(s) between communication entities of a group of communication enti-ties that have been provisioned to utilize the QKD-based wireless communication service, in accordance with various example embodiments.

Referring now to FIG. 11, a block diagram of a wireless network environment (1100) including a smart hub for QKD system (110) that facilitates, via a QKD-based wireless communication service, secure quantum key-based communication(s) between communication entities of a group of communication entities (106, 116) that have been provisioned to utilize the QKD-based wireless communication service is illustrated, in accordance with various example embodiments. The wireless network environment includes a macro network platform (1110), e.g., of a service provider cores network (120), that serves or facilitates communication, via slice(s) (not shown), with the group of communication entities.

Generally, macro network platform 1110 includes components, e.g., nodes, GWs, interfaces, servers, policy servers, and platforms that facilitate both packet-switched (PS), e.g., IP, frame relay, asynchronous transfer mode (ATM), and circuit-switched (CS) traffic, e.g., voice and data, and control generation for networked wireless communication, e.g., via the smart hub for QKD system. In various embodiments, macro network platform 1110 includes CS gateway (GW) node(s) 1112 that can interface CS traffic received from legacy networks like telephony network(s) 1140, e.g., public switched telephone network (PSTN), public land mobile network (PLMN), Signaling System No. 7 (SS7) network 1160. CS GW node(s) 1112 can authorize and authenticate traffic, e.g., voice, arising from such networks. Additionally, CS GW node(s) 1112 can access mobility or roaming data generated through SS7 network 1160; for instance, mobility data stored in a visitor location register (VLR), which can reside in memory 1130. Moreover, CS GW node(s) 1112 interfaces CS-based traffic and signaling with PS GW node(s) 1118. As an example, in a 3GPP UMTS network, PS GW node(s) 1118 can be embodied in GW general packet radio service (GPRS) support node(s) (GGSN).

As illustrated by FIG. 11, PS GW node(s) 1118 can receive and process CS-switched traffic and signaling via CS GW node(s) 1112. Further PS GW node(s) 1118 can authorize and authenticate PS-based data sessions, e.g., via smart hub for QKD system environment 100, with served devices, communication devices, and/or other devices. Such data sessions can include traffic exchange with networks external to macro network platform 1110, like wide area network(s) (WANs) 1150; enterprise networks (NWs) 1170, e.g., E911, service NW(s) 1180, e.g., an IP multimedia subsystem (IMS). It should be appreciated that local area network(s) (LANs), which may be a part of enterprise NW(s) 1170, can also be interfaced with macro network platform 1110 through PS GW node(s) 1118. PS GW node(s) 1118 can generate packet data contexts when a data session is established, e.g., associated with an EPS bearer context activation. To that end, in an aspect, PS GW node(s) 1118 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1114. It is to be noted that in 3GPP UMTS network(s), PS GW node(s) 1118 (e.g., GGSN) and tunnel interface (e.g., TTG) comprise a packet data GW (PDG).

Macro network platform 1110 also includes serving node(s) 1116 that can convey the various packetized flows of information, or data streams, received through PS GW node(s) 1118. As an example, in a 3GPP UMTS network, serving node(s) can be embodied in serving GPRS support node(s) (SGSN).

As indicated above, server(s) 1114 in macro network platform 1110 can execute numerous applications, e.g., messaging, location services, wireless device management that can generate multiple disparate packetized data streams or flows; and can manage such flows, e.g., schedule, queue, format. Such application(s), for example, can include add-on features to standard services provided by macro network platform 1110. Data streams can be conveyed to PS GW node(s) 1118 for authorization/authentication and initiation of a data session, and to serving node(s) 1116 for communication thereafter. Server(s) 1114 can also affect security, e.g., implement one or more firewalls, of macro network platform 1110 to ensure network's operation and data integrity in addition to authorization and authentication procedures that CS GW node(s) 1112 and PS GW node(s) 1118 can enact. Moreover, server(s) 1114 can provision services from external network(s), e.g., WAN 1150, or global positioning system (GPS) network(s), which can be a part of enterprise NW(s) 1180. It is to be noted that server(s) 1114 can include one or more processors configured to confer at least in part the functionality of macro network platform 1110. To that end, the one or more processors can execute code instructions stored in memory 1130, for example.

In other embodiments, server(s) 1110 can comprise policy server(s) to affect configuring, re-configuring, and/or provisioning of a wireless device (e.g., 106, 116) to facilitate a use of a slice and/or service, e.g., QKD-based wireless communication service.

In core network environment 1100, memory 1130 can store information related to operation of macro network platform 1110, e.g., related to operation of a wireless device (e.g., 106, 116) and/or smart hub for QKD system 110. The information can include data, e.g., business data, associated with subscribers of respective services; market plans and strategies, e.g., promotional campaigns, business partnerships, mobile devices served through macro network platform; service and privacy information, policies; end-user service logs for law enforcement; term(s) and/or condition(s) associated with wireless service(s) provided via service provider network. Memory 1130 can also store information from at least one of telephony network(s) 1140, WAN 1150, SS7 network 1160, enterprise NW(s) 1170, or service NW(s) 1180.

In one or more embodiments, components of core network environment 1100 can provide, e.g., via slice(s), communication services, e.g., QKD-based wireless communication service, to the wireless device via an over-the-air wireless link (e.g., 104, 114) corresponding to the RAN (101). In this regard, the RAN can include one or more: macro, Femto, or pico access points (APs), base stations (BS), landline networks (e.g., optical landline networks, electrical landline networks) communicatively coupled between the wireless device and macro network platform 1110.

Core network environment 1100 can include one or more of the Internet (or another communication network (e.g., IP-based network)), or DSL-type or broadband network facilitated by Ethernet or other technology. In various embodiments, core network environment 1100 can include hardware and/or software for allocating resources to the wireless device and smart hub for QKD system 110, converting or enforcing protocols, facilitating modification of communication policies for the wireless device (e.g., with respect to facilitating selection/re-selection of slices by the wireless device based on a past use of other slice(s) by the wireless device), establishing and/or providing levels of quality of service (QoS), e.g., based on such communication policies, providing applications or services, translating signals, and/or performing other desired functions to facilitate system interoperability and communication to/from the wireless device and service provider core network 120.

In other embodiment(s), core network environment 1100 can include data store component(s), a memory configured to store information, computer-readable storage media storing computer-executable instructions, e.g., memory 1130, enabling various operations performed via smart hub for QKD system 110 as described herein.

As it employed in the subject specification, the terms "processing component" and "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nanoscale architectures such as, but not limited to, molecular and quantum-dot based transistors, switches and gates, in order to optimize space usage or enhance performance of mobile devices. A processor may also be implemented as a combination of computing processing units.

In the subject specification, terms such as "memory", "memory component", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 1130, non-volatile memory 1222 (see below), disk storage 1224 (see below), and/or memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory 1220 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
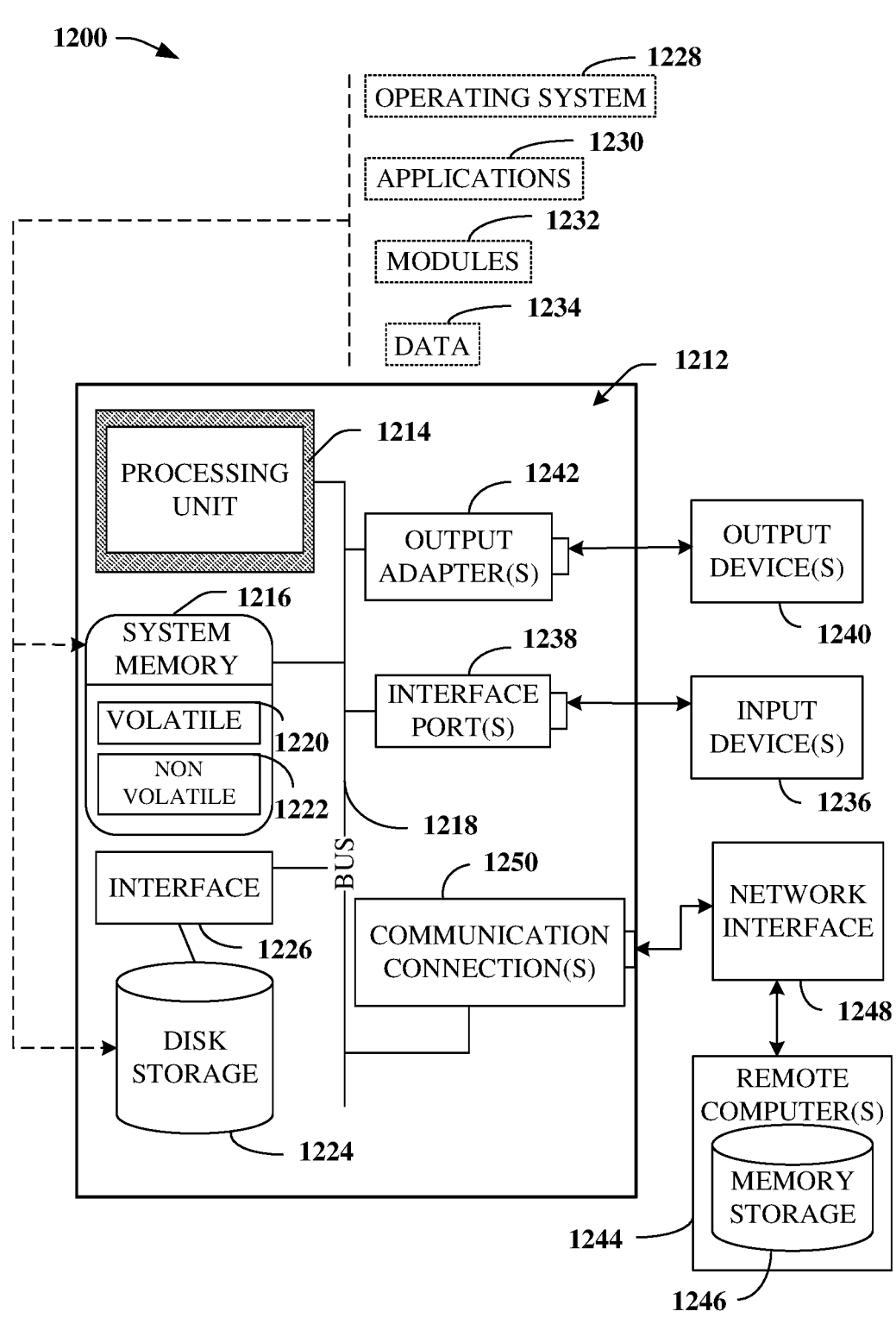
FIG. 12 is a block diagram representing an illustrative non-limiting computing system or operating environment in which one or more aspects of various embodiments described herein can be implemented.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules include routines, programs, components, and/or data structures that perform particular tasks and/or implement particular abstract data types.

Moreover, those skilled in the art will appreciate that the inventive systems can be practiced with other computer system configurations, including single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1212 includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, industrial standard architecture (ISA), microchannel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information into computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1214 through system bus 1218 via interface port(s) 1238. Interface port(s) 1238 include, for example, a serial port, a parallel port, a game port, a universal serial bus (USB), a wireless based port, e.g., WiFi, Bluetooth. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240, like display devices, light projection devices, monitors, speakers, and printers, among other output devices 1240, which use special adapters. Output adapters 1242 include, by way of illustration and not limitation, cards and/or video and sound devices that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically includes many or all of the elements described relative to computer 1212.

For purposes of brevity, only a memory storage device (e.g., 1246) is illustrated with remote computer(s) 1244. Remote computer(s) 1244 is logically connected to computer 1212 through a network interface 1248 and then physically and/or wirelessly connected via communication connection 1250. Network interface 1248 encompasses wire and/or wireless communication networks such as local-area networks (LAN) and wide-area networks (WAN). LAN technologies include fiber distributed data interface (FDDI), copper distributed data interface (CDDI), Ethernet, token ring and the like. WAN technologies include, but are not limited to, point-to-point links, circuit-switching networks like integrated services digital networks (e.g., ISDN) and variations thereon, packet switching networks, and digital subscriber lines (DSL).

Communication connection(s) 1250 refer(s) to hardware/software employed to connect network interface 1248 to bus

1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, wireless modems, ISDN adapters, and Ethernet cards.

The computer 1212 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes. The computer 1212 can connect to other devices/networks by way of antenna, port, network interface adaptor, wireless access point, modem, and/or the like.

The computer 1212 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least WiFi and Bluetooth wireless technologies. Thus, the communication can be a predefined structure as with a conventional network or simply an ad hoc communication between at least two devices.

WiFi allows connection to the Internet from a desired location (e.g., couch at home, a bed in a hotel room, a conference room at work) without wires. WiFi is a wireless technology similar to that used in a cell phone that enables such devices, e.g., mobile phones, computers, to send and receive data indoors and out, anywhere within the range of a base station. WiFi networks use radio technologies called IEEE 802.11 (a, b, g, and so on) to provide secure, reliable, fast wireless connectivity. A WiFi network can be used to connect devices (e.g., mobile phones, computers) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As utilized herein, terms "component," "system," "server," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, and process blocks can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, aspects, features, and/or advantages of the disclosed subject matter can be exploited in substantially any wireless telecommunication or radio technology, e.g., 4G, 5G, and beyond, IEEE 802.XX technology, e.g., Wi-Fi, Bluetooth; WiMAX; enhanced GPRS; 3GPP LTE; 3GPP2; UMB; 3GPP UMTS; HSPA; high speed downlink packet access (HSDPA); high speed uplink packet access (HSUPA); LTE-A, GSM, NFC, Wibree, Zigbee, satellite, Wi-Fi Direct.

Further, selections of a radio technology, or radio access technology, can include second generation (2G), third generation (3G), fourth generation (4G), fifth generation (5G), xth generation, and so on evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., UE, and/or within one or more elements of a network infrastructure, e.g., radio network controller, wireless access point (AP).

Moreover, terms like "user equipment", "wireless device", "mobile station", "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., smart hub for QKD system environment 100, for systems, methods, and/or apparatus disclosed herein can include any suitable mobile and/or wireline-based circuit-switched communication network including a GSM network, a time division multiple access (TDMA) network, a code division multiple access (CDMA) network, such as an Interim Standard 95 (IS-95) and subsequent iterations of CDMA technology, an integrated digital enhanced network (iDEN) network and a PSTN. Further, examples of the communication network can include any suitable data packet-switched or combination data packet/circuit-switched communication network, wired or wireless IP network such as a VoLTE network, a VoIP network, an IP data network, a UMTS network, a GPRS network, or other communication networks that provide streaming data communication over IP and/or integrated voice and data communication over combination data packet/circuit-switched technologies.

Similarly, one of ordinary skill in the art will appreciate that a wireless system e.g., a wireless communication device (e.g., 106, 116), for systems, methods, and/or apparatus disclosed herein can include a mobile device; a mobile phone; a 4G, 5G, and beyond device; a cellular communication device; a PSTN phone; a cellular communication device; a cellular phone; a satellite communication device; a satellite phone; a VoIP phone; a WiFi phone; a dual-mode cellular/WiFi phone; a combination cellular/VoIP/WiFi/WiMAX phone; a portable computer; or any suitable combination thereof. Specific examples of a wireless system can include, but are not limited to: a cellular device, such as a GSM, TDMA, CDMA, IS-95 and/or iDEN phone; a cellular/WiFi device, such as a dual-mode GSM, TDMA, IS-95 and/or iDEN/VoIP phone; UMTS phones; UMTS VoIP phones; or like devices or combinations thereof.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various aspects of the subject specification, AI-based systems, components, and/or devices can employ classifier(s) that are explicitly trained, e.g., via a generic training data, via policy rules of a policy framework, as well as implicitly trained, e.g., via observing characteristics of communication equipment, e.g., a gateway, a wireless communication device, by receiving reports from such communication equipment, by receiving operator preferences, by receiving historical information, and/or by receiving extrinsic information.

For example, support vector machines can be configured via a learning or training phase within a classifier constructor and feature selection module, component, or similar feature. Thus, the classifier(s) can be used by an AI system to automatically learn and perform a number of functions, e.g., performed by a system (e.g., smart hub for QKD system 110), including but not limited to: monitoring characteristics of the quantum key-based communication session; and storing the characteristics in a data store to facilitate analyses of the characteristics, in which the analyses of the characteristics comprises determining performance metrics of the quantum key-based communication session, and determining security metrics of the quantum key-based communication session In one embodiment, the classifier(s) can be used by the AI system to automatically determine, predict, and/or anticipate event(s)/condition(s), e.g., characteristics of the quantum key-based communication session.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user, e.g., subscriber, desires to be automatically performed. In the case of communication systems, for example, attributes can be information received from access points, services, systems, and/or components of a wireless communication network, and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, and/or explicit data. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, the operations comprising:
provisioning, using a network slice of a control plane of a communication network, a group of communication entities within the communication network to facilitate, via a quantum key distribution service, a quantum key-based communication session between a pair of communication entities of the group of communication entities, wherein the control plane is for managing at least one function of communication sessions of the communication network, wherein the provisioning the group of communication entities comprises registering communication entities of the group of communication entities as being authorized to access the quantum key distribution service for communicating between the communication entities of the group, and wherein the network slice comprises an isolated end-to-end virtualized network of the communication network; and
in response to receiving, from a communication entity of the pair of communication entities via the network slice, a first request to establish the quantum key-based communication session, sending, to a quantum key distribution system via a user plane of the communication network, a second request to establish, via the quantum key distribution service, the quantum key-based communication session using a quantum-based communication channel, wherein the user plane is for carrying user data for the communication sessions of the communication network.

2. The system of claim 1, wherein the quantum key distribution service distributes a quantum key between the pair of communication entities, wherein the quantum key has been generated by a quantum key encryption process, and wherein the quantum key is used, via the pair of communication entities, to encrypt the quantum key-based communication session to facilitate a secure communication between the pair of communication entities.

3. The system of claim 1, wherein the quantum-based communication channel comprises an optical fiber communication channel.

4. The system of claim 1, wherein the quantum-based communication channel comprises a satellite-based communication channel.

5. The system of claim 1, wherein the group of communication entities is a smart city group corresponding to a city represented by a defined geographical area, and wherein the communication entities comprise respective autonomous vehicles that are located within the defined geographical area.

6. The system of claim 1, wherein the group of communication entities is a smart city group corresponding to a city represented by a defined geographical area, and wherein the communication entities comprise respective mobile devices that are located within the defined geographical area.

7. The system of claim 1, wherein the group of communication entities is a first net group corresponding to public safety services, and wherein the communication entities comprise respective emergency response entities.

8. The system of claim 1, wherein the group of communication entities is a financial group corresponding to financial transactions, and wherein the communication entities comprise respective monetary transaction entities.

9. The system of claim 1, wherein the operations further comprise:

receiving an input from the communication entity, the input representing that a quantum key encryption process has been selected by the communication entity to be used for the quantum key-based communication session.

10. The system of claim 1, wherein the operations further comprise:

receiving an input from the communication entity, the input representing that the quantum key distribution system has been selected by the communication entity for establishment, via the quantum key distribution service, of the quantum key-based communication session.

11. The system of claim 1, wherein the registering comprises using the network slice via respective authentications, to authenticate the communication entities of the group of communication entities.

12. The system of claim 1, wherein the operations further comprise:

monitoring characteristics of the quantum key-based communication session; and storing the characteristics in a data store to facilitate analyses of the characteristics, wherein the analyses of the characteristics comprise:

determining performance metrics of the quantum key-based communication session, and determining security metrics of the quantum key-based communication session.

13. The system of claim 12, wherein the characteristics of the quantum key-based communication session comprise at least one of:

a photon measurement, a photon polarization, a photon entanglement, an attenuation of an electromagnetic radiation, or information representing that a potential security breach of the quantum key-based communication session has occurred.

14. The system of claim 13, wherein the operations further comprises:

in response to the communication entity being determined to be subscribed to a performance metric service of a network service provider identity of the communication network, sending the characteristics to the communication entity.

15. A method, comprising:

provisioning, by a system comprising a processor using a network slice of a control plane of a communication network, a group of communication devices within the communication network for a quantum key distribution-based communication between respective pairs of communication devices of the group of communication devices, wherein the control plane is for managing at least one function of communication sessions of the communication network, wherein the provisioning the group of communication devices comprises registering communication devices of the group of communication devices as being authorized to access a quantum key distribution service for communicating between the communication devices of the group, and wherein the network slice comprises an isolated end-to-end virtualized network of the communication network;

receiving, by the system from a communication device of a pair of communication devices of the respective pairs of communication devices via the network slice, a communication request to establish the quantum key distribution-based communication; and based on the communication request, sending, by the system via a user plane of the communication network, an establishment request to a quantum key distribution system to facilitate establishment, using a quantum-based communication channel via the quantum key distribution service, of the quantum key distribution-based communication, wherein the user plane is for carrying user data for the communication sessions of the communication network.

16. The method of claim 15, wherein the provisioning the group of communication devices further comprises:

authenticating, using the network slice, the communication devices for access to the quantum key distribution service.

17. The method of claim 15, wherein the quantum key distribution-based communication utilizes a quantum key that has been generated by a quantum key encryption process, and wherein the quantum key has been distributed, via the quantum key distribution service, to the pair of communication devices to facilitate, based on the quantum key, encryption and decryption of the quantum key distribution-based communication.

18. The method of claim 15, further comprising:

in response to characteristics of the quantum key distribution-based communication being monitored, storing, by the system, the characteristics in a data store to facilitate analyses of the characteristics corresponding to a performance of the quantum key distribution-based communication and a security of the quantum key distribution-based communication.

19. A machine-readable storage medium, comprising executable instructions that, when executed by a processor, facilitate performance of operations, the operations comprising:

provisioning, using a network slice of a control plane of a wireless network, a group of communication entities within the wireless network to facilitate a quantum key distribution-based communication between respective communication entities of the group of communication entities, wherein the control plane is for managing at least one function of communication sessions of the wireless network, wherein the provisioning the group of communication entities comprises registering communication entities of the group of communication entities as being authorized to access a quantum key distribution-based wireless service for communicating between the communication entities of the group, and wherein the network slice comprises an isolated end-to-end virtualized network of the communication network; and in response to receiving, from a communication entity of the respective communication entities, a communication request to securely communicate with another communication entity of the respective communication entities using a quantum key-based communication session corresponding to a quantum key distribution system, sending, via a user plane of the wireless network, a request to the quantum key distribution system to facilitate establishment, via the quantum key distribution-based wireless service, of the quantum key distribution-based communication using a quantum-based communication channel, wherein the user plane is for carrying user data for the communication sessions of the wireless network.

20. The machine-readable storage medium of claim 19, wherein the provisioning further comprises:

authenticating the communication entities to enable access to the quantum key distribution-based wireless service.

*    *    *    *    *